United States Patent [19]

Barnhart

[11] Patent Number: 5,447,331
[45] Date of Patent: Sep. 5, 1995

[54] VEHICLE AXLE OSCILLATION SYSTEM WITH POSITIVE GROUND CONTACT

[75] Inventor: Ronald W. Barnhart, Woodinville, Wash.

[73] Assignee: Genie Industries, Inc., Redmond, Wash.

[21] Appl. No.: 178,756

[22] Filed: Jan. 7, 1994

[51] Int. Cl.[6] .................................................. B60S 9/00
[52] U.S. Cl. ........................... 280/840; 180/41; 280/6.12; 280/714
[58] Field of Search ............. 280/840, 6.1, 6.11, 280/6.12, 772, 707, 714; 180/41, 282

[56] References Cited

U.S. PATENT DOCUMENTS 4,382,604  5/1983  Nakagawa ..................... 280/6.11
5,176,391  1/1993  Schneider et al. ............. 280/6.1
5,344,189  9/1994  Tanaka et al. ................. 280/840

Primary Examiner—Douglas C. Butler
Attorney, Agent, or Firm—Seed and Berry

[57] ABSTRACT

A suspension system for utility vehicles of the type in which the chassis is supported at one end on an oscillating axle with a central pivot, has the oscillation of this axle controlled by one or two extensible links each in the form of a hydraulic cylinder unit. The second vehicle axle has limited oscillation used to shuttle the spool of a directional control valve which determines the flow of pressurized fluid for operation of the hydraulic cylinder units(s). The control valve can also be electrically operated responsive to the closing of switches responsive to the oscillations of the second axle.

17 Claims, 2 Drawing Sheets

VEHICLE AXLE OSCILLATION SYSTEM WITH POSITIVE GROUND CONTACT

TECHNICAL FIELD

The present invention relates to suspension systems for utility vehicles of the type in which the chassis is supported at one end on an oscillating axle with a central pivot and is supported at the other end by a substantially fixed axle.

BACKGROUND OF THE INVENTION

The function of a suspension system with an oscillating axle is to allow for travel over irregular ground surfaces. However, in the case of vehicles such as those with a lift or rotating extensible boom, an oscillating axle has been a disadvantage for maximizing stability when the vehicle is stationary and the lift or boom are in operation. The object of the present invention is to provide an oscillating axle system in which there is a solid connection between the oscillating axle and the chassis when needed to maximize stability, and which also permits oscillation during driving of the associated vehicle without loss of stability.

SUMMARY OF THE INVENTION

In the practice of the present invention a chassis for carrying upper structures such as lifts and extensible booms is mounted on oscillating axles at both ends. These axles are centrally pivoted. One of the axle's oscillation is limited by fixed motion limiters while the other axle's oscillation is controlled by a variable length link or links preferably in the form of a hydraulic cylinder unit. When two hydraulic cylinder links are used each is powered to extend whereas when only one hydraulic link is used it is powered to extend and retract. The limited oscillation of the first axle is used to achieve sensing of which end of this axle has the greater load when an uneven loading condition exists. The tilt angle of the other axle relative to the chassis is then responsively adjusted to maximize stability by varying the length of the hydraulic link or links. The direction of the tilt is preferably indicated by a directional valve mounted between the chassis and the limited oscillation axle. This valve controls the direction of flow of pressurized fluid to and from the hydraulic link or links on the other axle. In an alternative arrangement the directional valve may be solenoid operated with the control signals being generated by normally open sensor switches closed by movements of the limited oscillation axle.

For ease of explanation in the detailed description and accompanying claims hereinwith presented, the limited oscillation axle will be spoken of as the rear axle and the oscillating axle with the hydraulic link or links will be spoken of as the front axle.

DETAILED DESCRIPTION OF THE INVENTION

Figure 1:
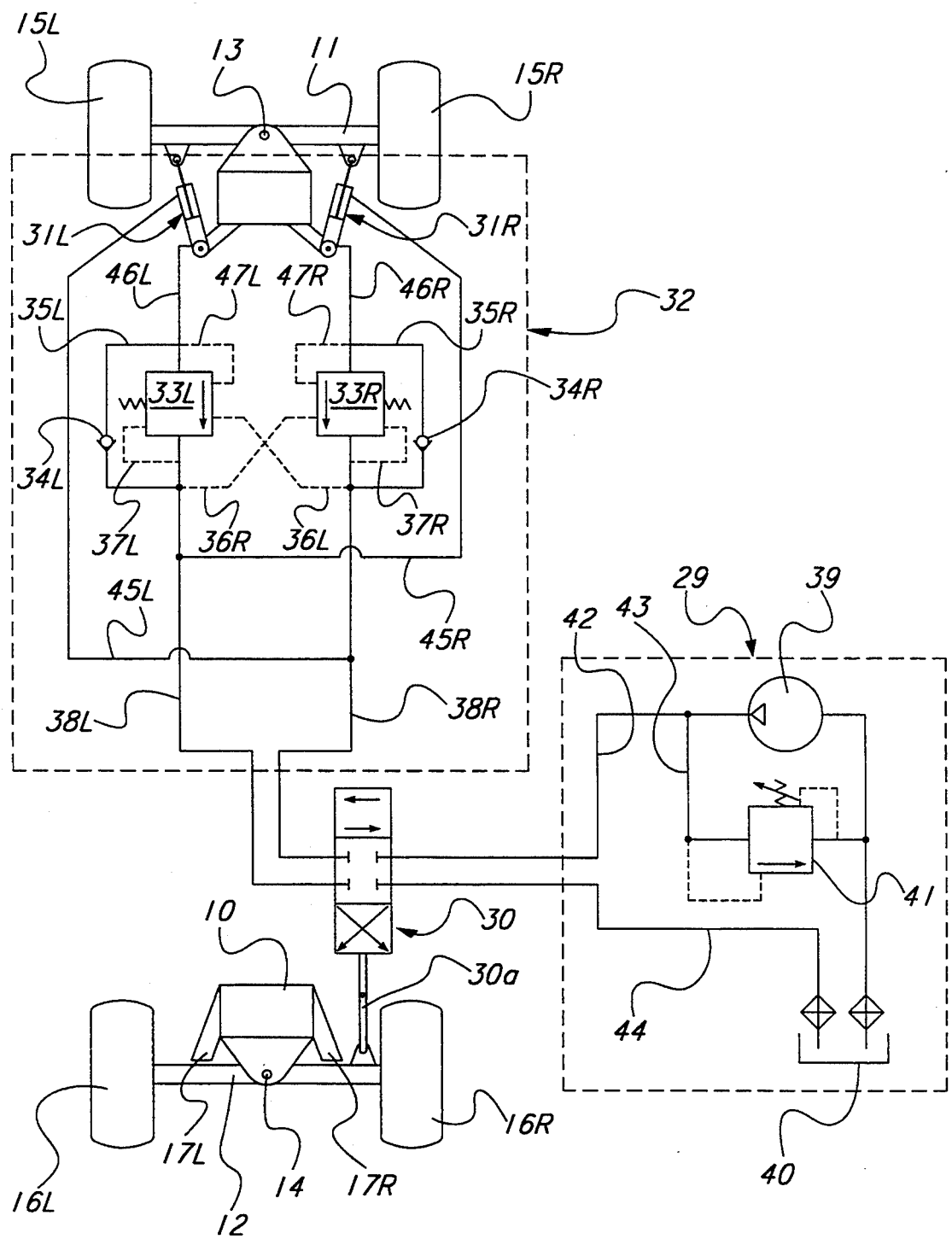
FIG. 1 is a schematic showing the general arrangement of wheels, axles, chassis, and hydraulic extensible links employed in the preferred embodiment of the present invention together with a preferred hydraulic system for controlling the extensible links.

Referring to the drawings, a vehicle chassis 10 is pivotally mounted at the center of front and rear axles 11, 12 at respective pivot pins 13, 14 extending in the fore and aft direction. The front axle 11 is supported by front right and left steerable wheels 15R, 15L and the rear axle has right and left wheels 16R, 16L. The four wheels may be directly driven by respective hydraulic motors. The steering mechanism and driving motors are not shown.

Oscillation of the rear axle 12 is limited to about one degree in either direction by stops 17R, 17L on the chassis. The direction in which the front axle 11 must be oscillated to maintain a balanced ground support condition is indicated by which stop is engaged. For example, if the right stop 17R bottoms out against the rear axle 12, this indicates that the included angle at the front axle oscillating pivot 13 between the right portion of the front axle 11 and the chassis 10 must be increased for a balanced ground support condition.

Sensing of the right or left oscillating direction of the rear axle 11 can be achieved in various ways. Two examples will be described hereinafter, one in which the oscillating direction is determined by a hydraulic sensor comprising a directional valve unit located between the chassis and rear axle at a location spaced from the oscillating pivot of the rear axle, and the other in which the oscillating direction is determined by electrical sensor switches positioned between the rear axle and chassis. In the first example the hydraulic cylinder unit comprising the sensor has a neutral partly extended position when the rear axle is in balanced position. Further extension of the unit indicates one oscillating direction and retraction from this neutral position indicates oscillation in the opposite direction.

It is preferred to have two front extension links, one on each side of the pivot axis of the front oscillating axle. When one of the links is extended the other link is retracted. However, as will be later described the system of the present invention can operate with only one front extension link.

The invention will first be described with the use of a directional control valve unit 30 between the rear axle 12 and the chassis 10 as indicated in FIG. 1, and with the use of two extension links between the chassis and front oscillating axle taking the form of hydraulic cylinder units 31R, 31L as indicated in FIG. 1. These two units are arranged with their cylinders pivotally connected to the chassis 10 and their piston rods pivotally connected to the front axle 11. The directional control valve 30 may be a 3-position, 4-way valve with an open center configuration. It has its casing pivotally connected at one end to the chassis 10, and has a spool with an extension link 30a pivotally connected to the rear axle 12 at a position offset from the center pivot 14. In FIG. 1 the spool is shown in its center no-flow position.

The directional control valve 30 controls flow between a pump/reservoir circuit 29 and a lock valve/check valve circuit 32 connected to the cylinder units 31R, 31L. The latter circuit includes a pair of lock valves 33R, 33L which are spring-loaded to a normal flow-blocking position as shown in FIG. 1, and are in parallel with respective check valves 34R, 34L located in by-pass lines 35R, 35L. The lock valves 33R, 33L are pilot operated and shifted to a flow-through position in opposition to their springs by pressurization of respective cross-over pilot lines 36R, 36L. Bleed lines 37R, 37L are provided at the spring end of the lock valves to bleed off any oil leakage in the lock valves. Flow connection between the lock valves 33R, 33L and the direction control valve 30 is made by lines 38R, 38L. These lines 38R, 38L are also connected by lines 45L-45R, respectively, with the lower piston rod ends of the cylinder units 31L, 31R. The upper piston ends of the cylinder units 31R, 31L are connected to the lock valves 33R, 33L by lines 46R, 46L. In case of undue pressure build-up in the system because of unusual thermal conditions, thermal release lines 47R, 47L connect lines 46R, 46L to the stop valves 33R, 33L to crack open the latter sufficiently to relieve excess pressure in the cylinders 31R, 31L.

The pump/reservoir circuit 29 has a pump 39, a reservoir 40, and a pressure relief valve 41. The latter is in parallel with the pump 39 to return pumped oil to the reservoir 40 from a pressure line 42 through a by-pass 43. The pressure line 42 leads to the directional valve 30, and a return line 44 leads from the directional valve 30 to the reservoir 40. Filters are preferably provided in the lines leading to and from the reservoir.

The directional control valve 30 functions, when not in its centered blocking position, to connect the pressurized supply line 42 in the pump/reservoir circuit 29 with line 38R or 38L in the lock valve/check valve circuit 32, and to simultaneously connect the reservoir line 44 in the pump/reservoir circuit 29 with whichever of the lines 38R or 38L is not connected to the supply line 42. When line 38R is pressurized, the check valve 34R is unseated and pressurized fluid from the pump 39 flows through supply line 42, directional control valve 30, line 38R, by-pass line 35R and line 46R to the upper end of the cylinder unit 31R. Simultaneously, the lower end of the cylinder 31R dumps to the reservoir 40 via line 45R, line 38L, valve 30, and line 44, and flow from line 38R moves through pilot line 36L and causes lock valve 37L to open. When this occurs the fluid in the upper end of cylinder unit 31L dumps via line 46L, line 38L, valve 30, and line 44 to the reservoir 40, and the lower end of cylinder unit 31L is charged from line 38R via line 45L, thereby retracting cylinder unit 31L as cylinder unit 31R is extended.

When the directional control valve 30 is shifted in the opposite direction, so that the line 38R is connected by the valve 30 with the dump line 44 rather than with the supply line 42, and so that the line 38L is connected by the valve 32 with the supply line 42 rather than with the dump line 44, the result is that check valve 34L is unseated and lock valve 33R is opened. Consequently, the cylinder unit 31L is extended and the cylinder unit 31R is correspondingly retracted.

When the vehicle is traveling over an uneven terrain the spool in the directional control 30 valve shuttles up and down such that rarely are the cylinder units 31R, 31L fully extended or retracted. The flow paths of the fluid in the lock valve/check valve circuit 29 are such that extension and retraction of the cylinder units is dampened.

Although it is preferred to provide a pair of variable length links for the front oscillating axle, one on each side of the oscillation axis, it is possible to use a single variable-length link in the form, for example, of a hydraulic double-acting cylinder with a powered extension and retraction rather than one side of the cylinder being vented to the reservoir as in the case of the double link arrangement previously described.

Figure 2:
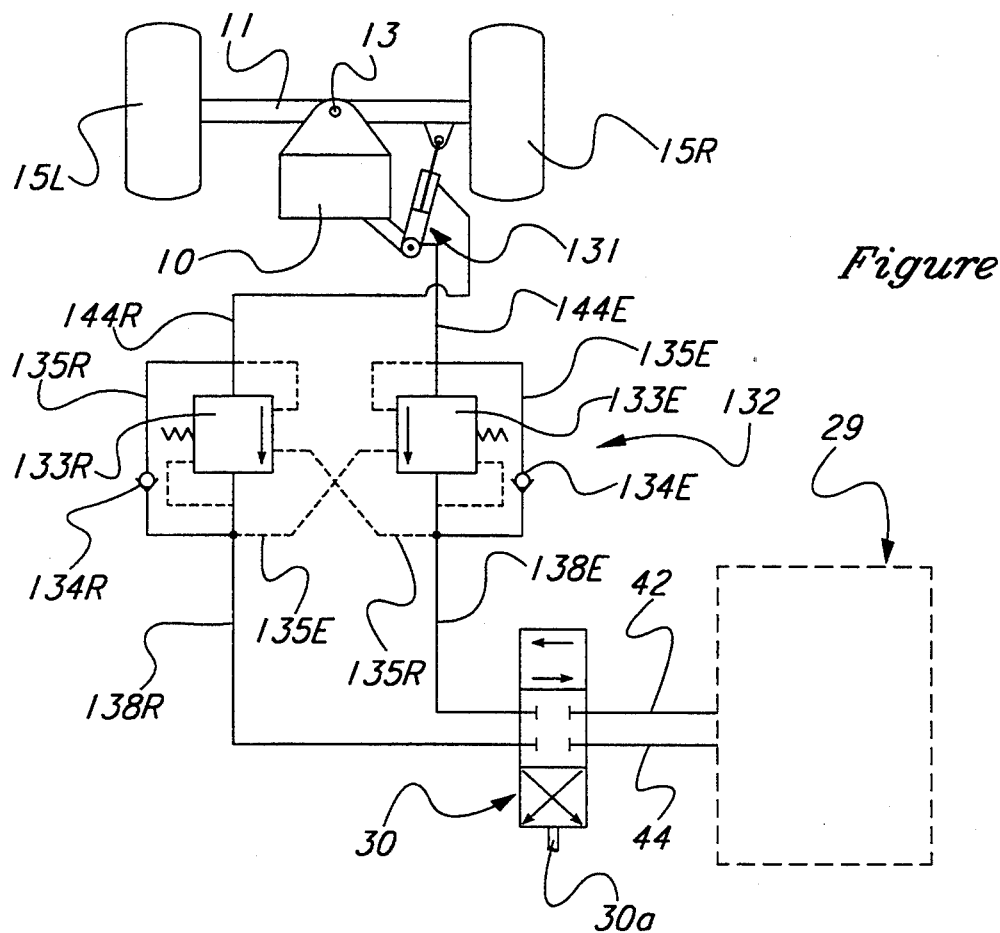
FIG. 2 is a schematic of a second embodiment using a single extensible link.

FIG. 2 is a schematic of the single link embodiment in which the link comprises a double-acting cylinder unit 131 pivotally connected to the chassis 10 and front axle 11 at a location spaced to the right (as shown) or left of the oscillation pivot 13 of the axle. A modified stop valve/check valve circuit 132 is provided eliminating the lines 45R, 45L from the circuit 32, and instead of a pair of spring-loaded lock valves being connected to a pair of hydraulic cylinder units as in the circuit 32 in the first embodiment, the circuit 132 in the second embodiment has a pair of normally-closed, spring-loaded lock valves 133E, 133R connected to opposite ends of the single hydraulic unit 131 by lines 144E, 144R. When one of the lock valves is in a flow-through condition the other lock valve is in a no-flow condition. This comes about by cross-over pilot lines 135R, 135E which, when pressurized, cause the respective lock valve 133R, 133E to shift to a flow-through position for flow away from the cylinder unit 131 to the reservoir. Lines 144E, 144R are also connected to by-pass lines 135E, 135R which contain check valves 134E, 134R and connect to lines 138E, 138R leading to the direction control valve 30. When the spool in valve 30 moves such as to connect the pump 39 in circuit 29 to line 138E via line 42 and valve 30, check valve 134E opens and exposes the upper piston end of the cylinder unit 131 to a supply of pressurized fluid. At the same time, stop valve 133R is opened by pressurization of pilot 135R to permit fluid on the lower rod side of the cylinder in unit 131 to dump to the reservoir 40 in circuit 29 via lines 144R and 138R, valve 30, and line 44. Likewise, when the spool in valve 30 moves such as to connect the output of the pump 39 to line 138R, check valve 134R opens and exposes the lower rod end of the cylinder unit 131 to a supply of pressurized fluid. At the same time, stop valve 133E is opened by pressurization of pilot 135E to permit fluid on the upper piston side of the cylinder in unit 131 to dump to reservoir 40 via lines 144E and 138E, valve 30 and line 44.

Figure 3:
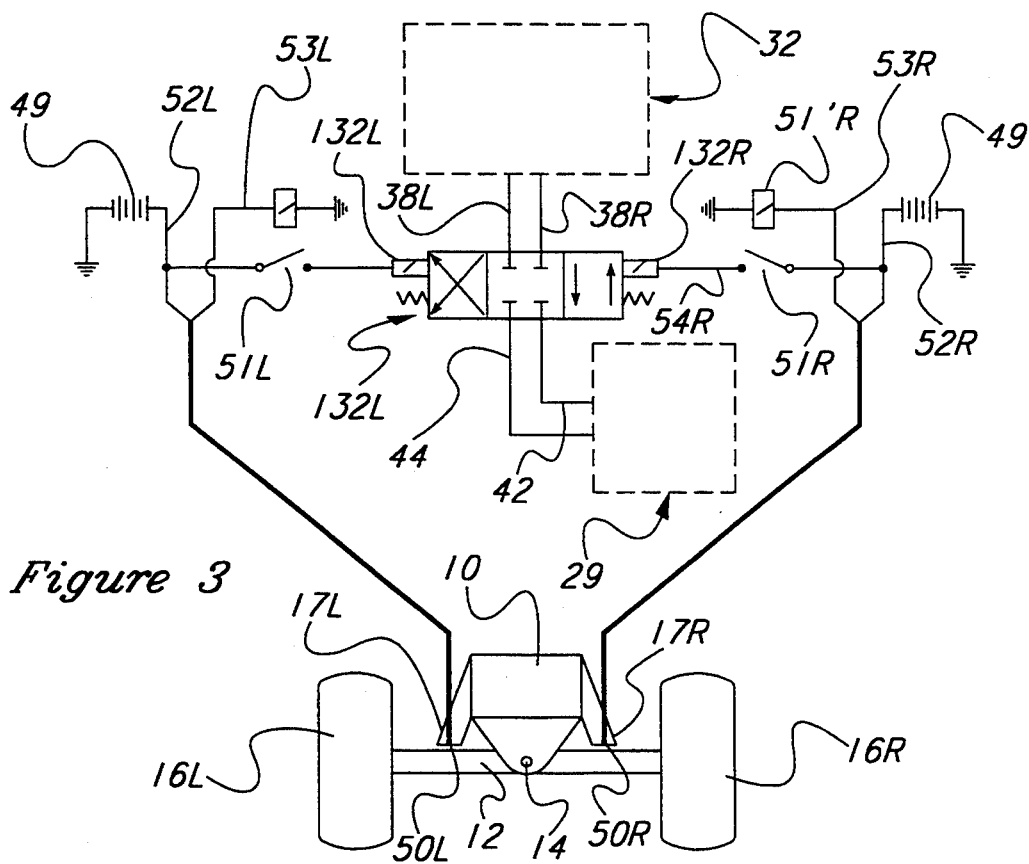
FIG. 3 is a schematic of a modified hydraulic control system for the first and second embodiments.

In an alternative embodiment shown in FIG. 3 the flow control valve 32 is replaced by a spring-centered flow control valve 132 which is operated by two solenoids 132R, 132L to control the direction of flow from the pump/reservoir circuit 29 to the hydraulic cylinder units 31R, 31L in the first embodiment or to the hydraulic cylinder unit 131 in the second embodiment. These two solenoids are controlled by respective normally open switches 50R, 50L arranged to be closed, respectively, responsive to engagement of the stops 17R, 17L on the rear axle due to right and left downward rocking of the chassis. Closing of switch 50R, for example, causes energizing of the solenoid 51'R for a relay switch 51R in a power circuit including a lead 52R from battery 49 to the switch 50R, and a lead 53R from switch 50R to the solenoid 51'R for a normally open relay switch 51R. A lead 54R connects between the relay switch 51R and the solenoid 132R so that the solenoid 132R is activated to shift the spool in the direction control valve 132 in a direction resulting in raising of the right front corner of the chassis relative to the right front wheel whenever switch 50R is closed.

Likewise, closing of switch 50L responsive to rocking of the chassis toward the left part of the rear axle causes activation of solenoid 132L by a power circuit like that previously described, and namely, one containing a solenoid 51'L for a normally open relay switch 51L, a lead 52L from battery 49 to the switch 50L, a lead 53L from switch 50L to the solenoid 51'L, and a lead 54L between the relay switch 51L and the solenoid 132L.

It will be appreciated that when the spool of the solenoid-operated direction control valve 132 is shifted responsive to closure of sensor switch 50R or 50L, the result is the same as when the spool of valve 32 is shifted responsive to downward or upward rocking, respectively, of the chassis relative to the right rear wheel of the vehicle.

From the foregoing it will be appreciated that, although specific embodiments of the invention have been described herein for purposes of illustration, various modifications may be made without deviating from the spirit and scope of the invention. Accordingly, the invention is not limited except as by the appended claims.

I claim:

1. A positive wheel to ground contact system for a vehicle having a chassis with right and left sides and front and rear ends, said system comprising:
   a front oscillating axle pivotally mounted on said chassis centrally of such axle;
   a front set of right and left wheels mounted on said front axle;
   a rear axle mounted on said chassis behind said front axle;
   a rear set of right and left wheels mounted on said rear axle and together with said front set providing a balanced ground support condition for said chassis when the wheels have coplanar ground contacts;
   variable length means extending between said chassis and front axle for controlling right and left oscillation of the chassis and front axle relative to one another by extension and retraction of said variable length means;
   length changing means for varying the effective length of said variable length means by extension and retraction thereof;
   control means for sensing differences from said balanced ground support condition by sensing changes in the loading between the right and left rear wheels resulting from changes in the topography of the ground surface engaged by the front and rear wheels;
   and operating means controlled by said control means and connected to said length changing means for causing whatever extension or retraction of said variable length means will maintain said balanced ground support condition.

2. A system according to claim 1, in which said rear axle is pivotally mounted on said chassis centrally of such axle for limited oscillation about an axis, and said control means is located between said rear axle and chassis for operation responsive to oscillation of said rear axle relative to said chassis from a neutral position corresponding to said balanced ground support condition.

3. A system according to claim 1, in which said variable length means comprises a hydraulic cylinder unit and said operating means comprises a hydraulic circuit connected to said variable length means and controlled by said control means.

4. A system according to claim 3, in which said control means includes a direction control valve mounted between said chassis and rear axle at a location offset from said axis, said valve having a flow blocking neutral position when said balanced ground support condition exists, and having alternate pressurizing and dumping flow-through positions when said rear axle has oscillated to positions where such condition does not exist.

5. A system according to claim 3, in which said control means comprises a pair of normally open switches located on opposite sides of said axis, said switches being arranged to be selectively closed responsive to oscillation of said rear axle and chassis relative to one another, and in which a solenoid-operated direction control valve in said hydraulic circuit is electrically connect to said switches.

6. A system according to claim 3, in which said hydraulic circuit includes a pump and a reservoir connected to the pump, and in which said control means includes a three-position hydraulic direction control valve arranged to block flow from said pump and block return to said reservoir when in a first position corresponding to a neutral condition of said control means, and to selectively provide for flow from the pump to said hydraulic cylinder unit and return flow from the cylinder unit to the reservoir when said control valve is in its other two positions corresponding to a departure from a balanced ground support condition.

7. A positive wheel to ground contact system for a vehicle having a chassis with right and left sides and front and rear ends, said system comprising:
   a front oscillating axle pivotally mounted on said chassis centrally of such axle;
   a front set of right and left wheels mounted on said front axle;
   a rear axle mounted on said chassis behind said front axle;
   a rear set of right and left wheels mounted on said rear axle and together with said front set providing a balanced ground support condition for said chassis when the wheels have coplanar ground contacts;
   right and left variable length units extending between said chassis and front axle for controlling right and left oscillation of the chassis and front axle relative to one another;
   length changing means for varying the effective lengths of said units relative to one another;
   control means for sensing differences from said balanced ground support condition by sensing changes in the loading between the right and left rear wheels resulting from changes in the topography of the ground surface engaged by the front and rear wheels;
   and operating means between said control means and length changing means for causing lengthening of whichever of said variable length units will maintain said balanced ground support condition by being lengthened relative to the other variable length unit, and for locking said variable length units when said balanced ground support condition exists.

8. A system according to claim 7, in which said operating means causes lengthening of the variable length unit located on the same side of the chassis as the rear wheel is located which is sensed by the control means as having an increase in load relative to the load on the other rear wheel.

9. A system according to claim 7, in which said rear axle is pivotally mounted on said chassis centrally of such axle for limited oscillation, and said control means is located between said rear axle and chassis for activation responsive to oscillation of said rear axle relative to said chassis from a neutral position corresponding to said balanced ground support condition.

10. A system according to claim 9, in which said control means comprises a three-position four-way direction control valve mounted between said chassis and rear axle, said control valve having a no-flow center position corresponding to said balanced ground support condition, the other two positions of said control valve being alternatively used when the rear of said chassis has oscillated toward or away from one of said rear wheels.

11. A system according to claim 7, in which said variable length units each comprise a respective hydraulic cylinder unit, and said operating means comprises a hydraulic circuit connected to said hydraulic cylinder units and controlled by said control means.

12. A system according to claim 11, in which said hydraulic circuit includes a pump, a reservoir connected to the pump, a three-position direction control valve operated by said control means such as to block flow from said pump and block return to said reservoir when in a first position corresponding to a neutral condition of said control means, and to selectively provide for flow from the pump to one of said cylinder units and return flow from the other cylinder unit to the reservoir when said control valve is in its other two positions.

13. A system according to claim 12, in which said direction flow control valve is spring centered into said first condition, and is moved to said other two positions by two solenoids alternatively activated by said control means.

14. A system according to claim 9, in which said control means comprises a pair of normally open switches located on opposite sides of the oscillation pivot for said rear axle, said switches being arranged to be selectively closed responsive to oscillation of said rear axle and chassis relative to one another.

15. A positive wheel to ground contact system for a vehicle having a chassis with right and left sides and front and rear ends, said system comprising:

a front oscillating axle pivotally mounted on said chassis centrally of such axle;

a front set of right and left wheels mounted on said front axle;

a front set of right and left wheels mounted on said front axle;

a rear oscillating axle pivotally mounted on said chassis behind said front axle for limited oscillation;

a rear set of right and left wheels mounted on said rear axle and together with said front set providing ground support for said chassis;

right and left variable length units extending between said chassis and front axle for controlling right and left oscillation of the chassis and front axle relative to one another;

length changing means for varying the effective lengths of said units relative to one another;

sensing means located between said rear axle and chassis for activation responsive to oscillation of said rear axle relative to said chassis from a neutral position of the chassis at which said sensing means is in an inactive condition;

and operating means between said sensing means and length changing means for causing lengthening of whichever of said variable length units will return said chassis to said neutral position by being lengthened, and for locking said variable length units when said neutral position exists.

16. A system according to claim 15, in which said variable length units comprise respective hydraulic cylinder units and said operating means controls the flow of pressurized fluid to and from said units.

17. A system according to claim 16, in which said sensing means comprises a direction control valve in said operating means, said direction control valve being connected between said chassis and rear axle and having a neutral flow-blocking position when said chassis is in its neutral position and otherwise directing flow to and from said hydraulic cylinder units.

* * * * *